US010055804B2

(12) United States Patent
Juckett et al.

(10) Patent No.: US 10,055,804 B2
(45) Date of Patent: Aug. 21, 2018

(54) ROAMING TRANSPORT DISTRIBUTION MANAGEMENT SYSTEM

(71) Applicant: MetroBee, LLC, Rochester Hills, MI (US)

(72) Inventors: Daniel Juckett, Livonia, MI (US); Timothy Lee Juckett, Casselberry, FL (US); Eric A. Zeile, Rochester, MI (US); Benjamin J. Edelberg, Woodland Hills, CA (US)

(73) Assignee: METROBEE, LLC, Rochester, MI (US)

( * ) Notice: Subject to any disclaimer, the term of this patent is extended or adjusted under 35 U.S.C. 154(b) by 708 days.

(21) Appl. No.: 14/491,565

(22) Filed: Sep. 19, 2014

(65) Prior Publication Data

US 2015/0012320 A1 Jan. 8, 2015

Related U.S. Application Data

(63) Continuation-in-part of application No. 13/563,618, filed on Jul. 31, 2012, now abandoned.

(60) Provisional application No. 61/937,880, filed on Feb. 10, 2014, provisional application No. 61/879,737, filed on Sep. 19, 2013.

(51) Int. Cl.
*G06Q 50/30* (2012.01)
*G06Q 10/04* (2012.01)
*G06Q 10/06* (2012.01)

(52) U.S. Cl.
CPC ........... *G06Q 50/30* (2013.01); *G06Q 10/047* (2013.01); *G06Q 10/0631* (2013.01); *G06Q 10/063116* (2013.01)

(58) Field of Classification Search
CPC ............... G06Q 10/0631; G06Q 10/063116
USPC ......................................................... 705/7.16
See application file for complete search history.

(56) References Cited

U.S. PATENT DOCUMENTS

| 4,360,875 A | 11/1982 | Behnke |
| 5,265,006 A | 11/1993 | Asthana et al. |
| 5,604,676 A | 2/1997 | Penzias |

(Continued)

FOREIGN PATENT DOCUMENTS

| EP | 1172768 A2 | 1/2002 |
| JP | H04361183 A | 12/1992 |

(Continued)

*Primary Examiner* — Romain Jeanty
(74) *Attorney, Agent, or Firm* — Young Basile Hanlon & MacFarlane, P.C.

(57) ABSTRACT

A roaming transport distribution management apparatus and method are provided. A controller selects transports within a defined service zone in response to customer transit requests from customer locations or a central hub which are capable of meeting maximum transit time to the end destination in either an inbound or outbound direction from the hub. A hub manager varies the position and/or the size of an exclusive coverage area of each transport within the overall service zone to insure a dense accumulation of transports over the entire service zone and alters the position of other transports in response to the movement of a transport inbound or outbound from the hub with a passenger. The hub manager can vary the size of the exclusive coverage area of each transport to account for population and request call densities and the number of available transports.

19 Claims, 12 Drawing Sheets

(56) References Cited

U.S. PATENT DOCUMENTS

| | | | |
|---|---|---|---|
| 5,751,973 A | 5/1998 | Hassett | |
| 5,799,263 A | 8/1998 | Culbertson | |
| 5,930,474 A | 7/1999 | Dunworth et al. | |
| 6,317,720 B1 | 11/2001 | Murakami et al. | |
| 6,356,838 B1 | 3/2002 | Paul | |
| 6,411,897 B1 | 6/2002 | Gaspard, II | |
| 6,456,207 B1 | 9/2002 | Yen | |
| 6,459,986 B1 | 10/2002 | Boyce et al. | |
| 6,516,056 B1 | 2/2003 | Justice et al. | |
| 6,519,463 B2 | 2/2003 | Tendler | |
| 6,756,913 B1 | 6/2004 | Ayed | |
| 6,941,197 B1 | 9/2005 | Murakami et al. | |
| 7,191,057 B2 | 3/2007 | Adamczyk | |
| 7,245,925 B2 | 7/2007 | Zellner | |
| 7,268,700 B1* | 9/2007 | Hoffberg | G08G 1/0104 340/539.17 |
| 7,412,042 B2 | 8/2008 | Henry | |
| 7,499,714 B2 | 3/2009 | Ki | |
| 7,561,069 B2 | 7/2009 | Horstemeyer | |
| 7,979,292 B2 | 7/2011 | Hamilton, II et al. | |
| 8,005,695 B2 | 8/2011 | de Marcken et al. | |
| 8,005,696 B2 | 8/2011 | de Marcken et al. | |
| 8,024,112 B2 | 9/2011 | Krumm et al. | |
| 8,041,506 B2 | 10/2011 | Bliss et al. | |
| 8,099,085 B2 | 1/2012 | Lowry | |
| 8,131,307 B2 | 3/2012 | Lubeck et al. | |
| 8,355,862 B2 | 1/2013 | Matas et al. | |
| 2002/0194129 A1 | 12/2002 | Furuya et al. | |
| 2003/0177062 A1 | 9/2003 | Chen | |
| 2004/0112959 A1 | 6/2004 | Jun | |
| 2004/0158483 A1 | 8/2004 | Lecouturier | |
| 2004/0181326 A1 | 9/2004 | Adams et al. | |
| 2004/0219933 A1 | 11/2004 | Faith | |
| 2005/0278114 A1 | 12/2005 | Ahmad | |
| 2006/0034201 A1 | 2/2006 | Umeda et al. | |
| 2006/0059023 A1 | 3/2006 | Mashinsky | |
| 2006/0184934 A1 | 8/2006 | Karlberg | |
| 2006/0259353 A1 | 11/2006 | Gutmann | |
| 2007/0073552 A1 | 3/2007 | Hileman | |
| 2008/0014908 A1 | 1/2008 | Vasant | |
| 2008/0114629 A1 | 5/2008 | Pavlov | |
| 2008/0189143 A1 | 8/2008 | Wurster | |
| 2008/0189144 A1 | 8/2008 | Wurster | |
| 2008/0189145 A1 | 8/2008 | Wurster | |
| 2008/0189207 A1 | 8/2008 | Wurster | |
| 2008/0189226 A1 | 8/2008 | Wurster | |
| 2008/0195428 A1 | 8/2008 | O'Sullivan | |
| 2008/0201212 A1 | 8/2008 | Hammad et al. | |
| 2008/0208681 A1 | 8/2008 | Hammad et al. | |
| 2008/0270204 A1 | 10/2008 | Poykko et al. | |
| 2009/0030885 A1 | 1/2009 | DePasquale et al. | |
| 2009/0192851 A1 | 7/2009 | Bishop | |
| 2009/0210276 A1 | 8/2009 | Krumm et al. | |
| 2009/0216600 A1 | 8/2009 | Hill | |
| 2009/0254270 A1 | 10/2009 | Yu | |
| 2009/0287527 A1 | 11/2009 | Kolb et al. | |
| 2009/0313095 A1 | 12/2009 | Hurpin | |
| 2009/0326991 A1* | 12/2009 | Wei | G06Q 10/02 705/5 |
| 2010/0017275 A1 | 1/2010 | Carlson et al. | |
| 2010/0161392 A1 | 6/2010 | Ashby et al. | |
| 2010/0185486 A1 | 7/2010 | Barker et al. | |
| 2010/0299177 A1 | 11/2010 | Buczkowski et al. | |
| 2010/0332242 A1 | 12/2010 | Kamar et al. | |
| 2011/0022428 A1 | 1/2011 | Parker | |
| 2011/0077984 A1 | 3/2011 | Gilliam | |
| 2011/0145025 A1 | 6/2011 | Jiang et al. | |
| 2011/0153629 A1 | 6/2011 | Lehmann et al. | |
| 2011/0208567 A9 | 8/2011 | Roddy et al. | |
| 2011/0301985 A1 | 12/2011 | Camp et al. | |
| 2011/0307282 A1 | 12/2011 | Camp et al. | |
| 2011/0313804 A1 | 12/2011 | Camp et al. | |
| 2012/0041675 A1* | 2/2012 | Juliver | G06Q 10/08 701/465 |
| 2012/0323642 A1 | 12/2012 | Camp et al. | |
| 2013/0024249 A1 | 1/2013 | Zohar et al. | |
| 2013/0073327 A1 | 3/2013 | Edelberg | |
| 2013/0158846 A1 | 6/2013 | Zhang | |
| 2015/0227871 A1 | 8/2015 | Zeile et al. | |

FOREIGN PATENT DOCUMENTS

| | | |
|---|---|---|
| JP | 2000341397 A | 12/2000 |
| JP | 2002149527 A | 5/2002 |
| JP | 2004046309 A | 2/2004 |
| JP | 2006184934 A | 7/2006 |
| JP | 2007172116 A | 7/2007 |
| JP | 2009205658 A | 9/2009 |
| JP | 2009250643 A | 10/2009 |
| JP | 2010092414 A | 4/2010 |
| JP | 2011081717 A | 4/2011 |
| KR | 100537728 B1 | 12/2005 |
| KR | 20100053717 A | 5/2010 |

\* cited by examiner

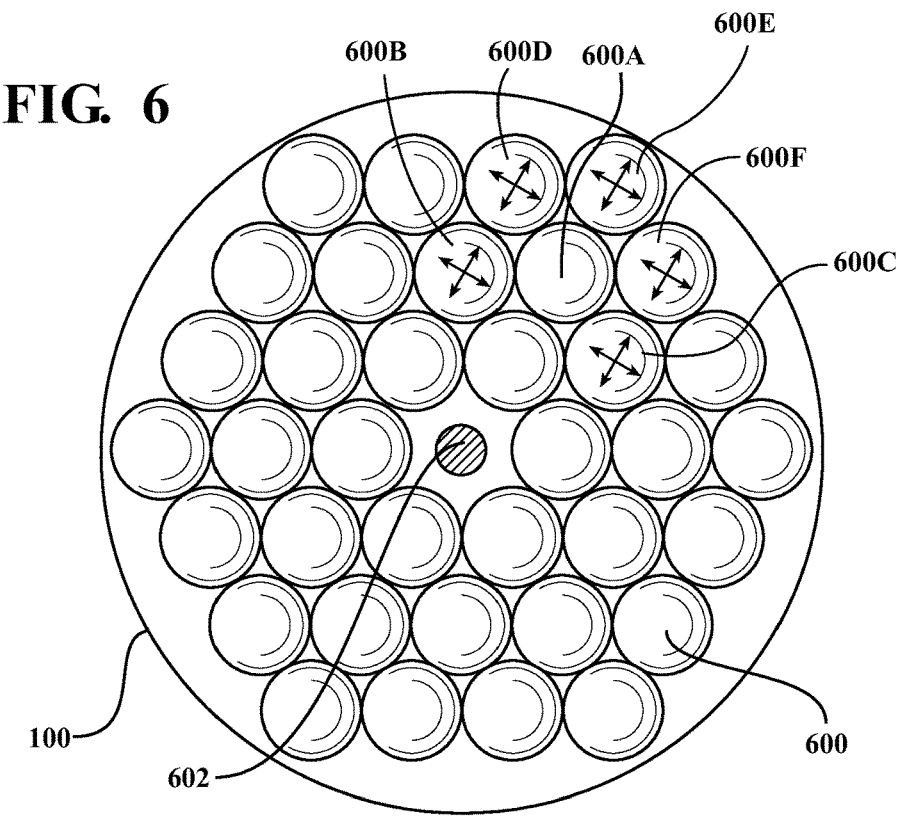
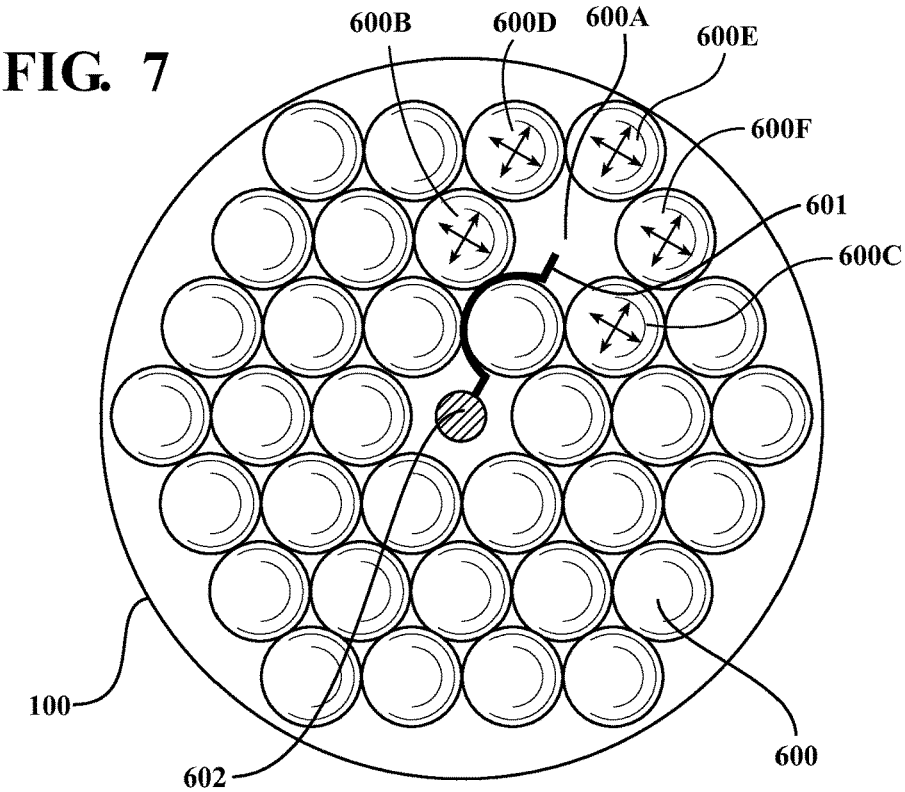

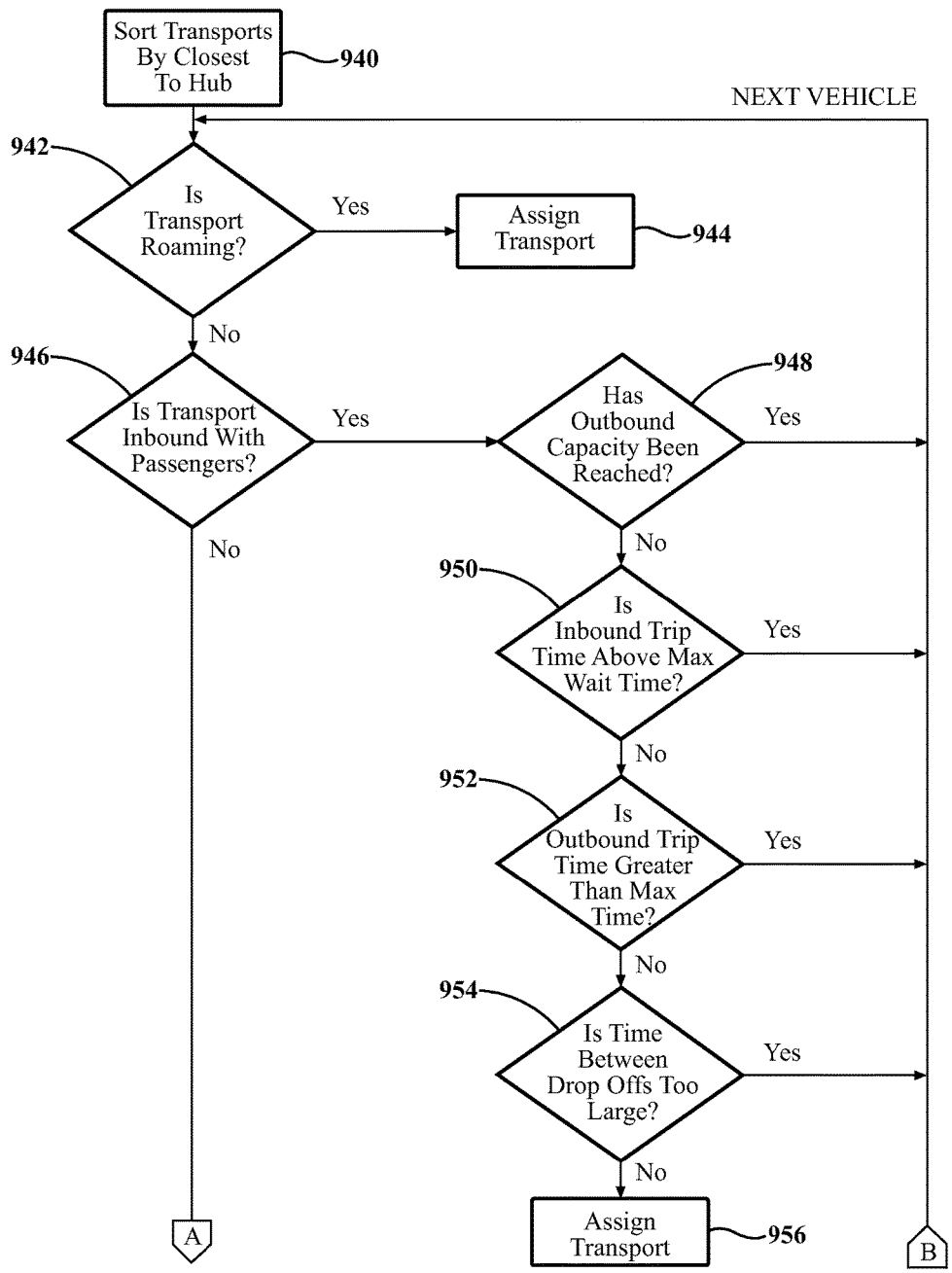

ROAMING TRANSPORT DISTRIBUTION MANAGEMENT SYSTEM

CROSS REFERENCE TO CO-PENDING APPLICATION

This application claims priority benefit to the Feb. 10, 2014 filing date of provisional patent application Ser. No. 61/937,880 for ROAMING TRANSPORT DISTRIBUTION MANAGEMENT SYSTEM and to the Sep. 19, 2013 filing date of provisional patent application Ser. No. 61/879,737 for ROAMING TRANSPORT DISTRIBUTION MANAGEMENT SYSTEM, and is a continuation-in-part of co-pending U.S. patent application Ser. No. 13/563,618, filed on Jul. 31, 2012 for URBAN TRANSPORTATION SYSTEM AND METHOD, assigned to the assignee of the present application, which claims priority to U.S. provisional patent application Ser. No. 61/626,123 filed on Sep. 20, 2011, the contents of all which are incorporated herein in their entirety.

BACKGROUND

The present apparatus and method relate to urban transportation systems.

U.S. Patent Publication 2013/0073327 discloses an urban transportation system and method, which provides flexible, door-to-door transportation service between customers within a service area surrounding a node of a station of an urban transportation system, such as a train station, subway station, etc.

In response to a customer request, a transport within a defined service area travels to the location of the customer and then transports the customer between the pick-up location and the node in the transportation system which is the central hub in the service zone. The transport service request instructions are dynamically determined in real time with respect to the customer pick-up location, the current location of the transport, and a predetermined maximum allowable travel time between the customer pick-up and drop-off at the node.

The predetermined travel time may be calculated for a transport using the time that the customer reaches the transit node starting with the time of the pick-up request from the customer until the time the customer reaches the transit node or from the time the customer is picked up and dropped off at the node. Either time periods define the predetermined time period essential to efficient operation of the transit model. For example, if a 15 minute predetermined time period is selected for operation of the transit system, and the first time period calculation described above is utilized then the transit system must respond to a pick-up request from a customer by directing a transport at a second location within the service area surrounding node to the location of the customer, pick-up the customer and then travel by a flexible, real time determined route to the node so that the customer reaches the node within 15 minutes of initiating a pick-up request.

SUMMARY

A roaming transport distribution apparatus and method for servicing customer requests for transportation of customers within a service zone.

The method includes operating a plurality of transports in a first service zone for transporting customers within the first service zone to and from a first hub and receiving a service request from a first customer at a first location in the first service zone for transportation of the first customer to and/or from the first hub.

Next, the method locates one transport of the plurality of transports in the first service zone to answer the service request based on one or more of the location of the first customer, the location of the transport, the distance between the two locations, a travel time of the transport from its location to the customer location, and a travel time of the transport with the picked-up customer from the first location to the first hub or from the first hub to another customer destination.

A system manager sends a communication to a transport with a location to pick up the first customer. The system manager further sends a communication to the transport of a travel route from pick up location of the first customer to a customer drop-off location.

The system manager directs the plurality of transports in the first service zone to unequally distributed locations with exclusive coverage areas of the transports which are disposed in a non-overlapping arrangement within the first service zone.

The method can further unequally distribute all of the transports in the first service zone based on one of population density, historic request density and traffic conditions, creating an exclusive coverage service area about each transport in the first service zone, where the coverage service areas are disposed in a dynamic arrangement with adjacent exclusive transport service sub-areas, and directing the plurality of transports in the first service zone to unevenly distributed locations with non-overlapping coverage areas.

According to the method, after one transport picks up the first customer at the first location, the one transport is removed from roaming in the first service zone. The method relocates the position of at least one other transport in the service zone so that the coverage areas of all of the transports are disposed in a dynamic arrangement to insure the predetermined transit time is met for all areas in the service zone.

In the method, after the one transport picks up the first customer at the first location and the first transport is removed from roaming in the first service zone, the size and/or location of the coverage areas of at least one of the transports in the service zone is varied to meet the predetermined transit time at all locations within the first service zone.

The method further includes choosing the one transport of the plurality of transports to answer a service request where the location of the transport relative to a customer issuing a service request satisfies one of a minimum wait time of customer pick-up and a less than maximum transit time of the customer to the customer destination.

The method further includes reinserting a new transport into the first service zone and redistributing all of the coverage areas of the plurality of transports in the first service zone to insure distribution of the coverage areas in the first service zone without overlap.

The roaming transportation distribution apparatus includes a system manager choosing the one transport of the plurality of transports to answer a service request where the location of the transport relative to a customer issuing a service request satisfies one of a minimum wait time for customer pick-up and less than a maximum transit time of the customer to the customer destination.

The system manager wirelessly communicates travel information to each of the transports to optimize travel of a transport from a current location of the transport to a customer and/or from a customer pick-up location to a customer drop-off destination.

The system manager in response to removal of a transport from the plurality of transports in a first service zone when the transport is answering a service request, issues new coordinate information by wireless communication to at least one other transport in the first service zone to redistribute the remaining plurality of transports in the first service zone.

The system manager, executing program instructions, based on current coordinate locations of the plurality of transports remaining in roaming in the first service zone, to vary a size of the coverage area of at least one of the remaining transports to meet transport transit times associated with responses to customer requests

BRIEF DESCRIPTION OF THE DRAWING

The various features, advantages, and other uses of the present apparatus and method will become more apparent by referring to the following detailed description and drawing in which:

FIGS. 6, 7, 8, and 9A-9D are pictorial representations illustrating the operation of the present apparatus and method to implement distribution of the transport transports within a service area;

FIGS. 12A and 12B are flow diagrams depicting the operation of the apparatus and method for an outbound request.

DETAILED DESCRIPTION

Figure 1:
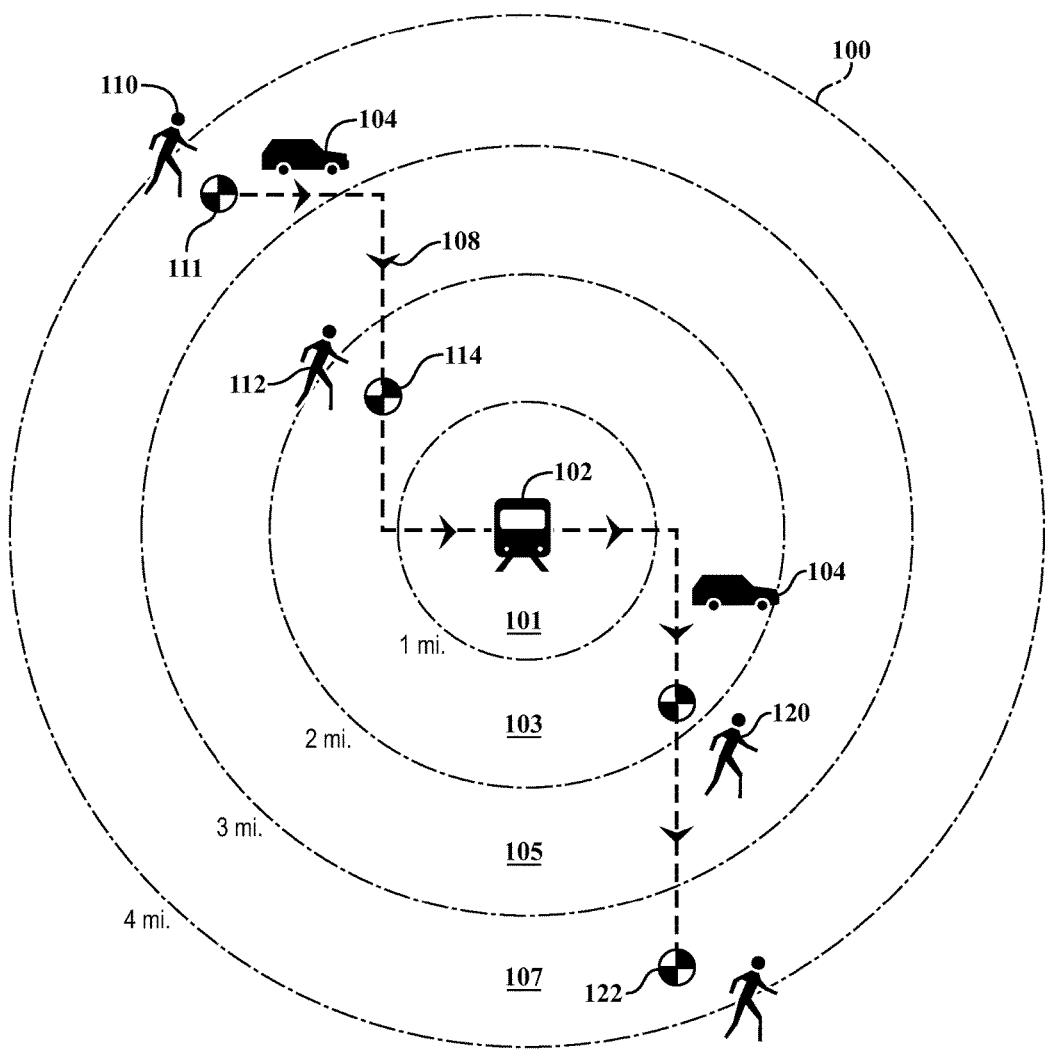
FIG. 1 is a conceptual diagram illustrating a transportation system providing transportation service to a service zone around a transit mode.

FIG. 1 depicts a service zone 100 which surrounds a centrally located node 102, which may be a train or subway station or a bus stop in an urban transit or transportation system, or any other transportation system having defined locations for transport vehicles to pick-up and drop off passengers. The node 102 also acts as the central hub 102 of the service zone 100, and the terms node and hub are used interchangeably herein. The service zone 100 may also be referred to as a coverage area herein.

The service zone 100 is illustrated with multiple sub zones and has service transports distributed through each of the sub zones to minimize travel time between the location of the transport, a pick-up location of a customer requesting a pick-up, and the delivery of the customer to the end drop off destination. It is desirable to provide improvement to such an urban transportation system so as to minimize pick up time as well as meeting the maximum travel time to the drop off location.

The service zone 100 may be a single large defined area, with a circular service zone shown by way of example only. It will be understood that the service zone 100 may take other shapes, such as polygonal, triangular, oval, etc., depending upon geographic features surrounding the node 102, population density, service request density and other factors.

Further, the service zone 100 is illustrated with concentric sub-zones 101, 103, 105 and 107, with four sub-zones shown in FIG. 1 spaced at one mile, two mile, three mile, and four mile radii, respectively, from the central hub 102.

Service transports (hereafter "transports") 104, 106 may be distributed throughout the sub-zones of the larger service zone 100 to minimize travel time between the location of the transport 104 and a pick up location 111 of a customer 110 initiating a pick-up service request. The transports 104, 106 may be any type of transport, such as a car, minivan, bus, SUV, etc.

Each transport 104, 106, etc., has global positioning system (GPS) capability. A GPS transceiver can be mounted in each transport 104, 106 for communication with the global positioning satellite network to provide a central system manager with the current GPS coordinates of each transport 104, 106.

Each transport 104 and 106 also has wireless communication capability with the system manager. The wireless communication capability can include a cellular network transmitter and receiver mounted in the vehicle for communication between the transport 104, 106 and the system manager via a cellular telephone network. Such cellular wireless communication can also be implemented by using the driver's cellular telephone for direct communication via the cellular network with the system manager or through the cellular telephone system of the transport 104, 106.

Other forms of wireless communication, including satellite communication, etc., can also be employed to transfer data between each transport 104, 106 and the central manager.

The overall size of the service zone 100 is selected so that predetermined transit time, such as 15 minutes for example, can be met for all customer pick-up requests at any location within the service zone 100 to the drop off destination.

Figure 3:
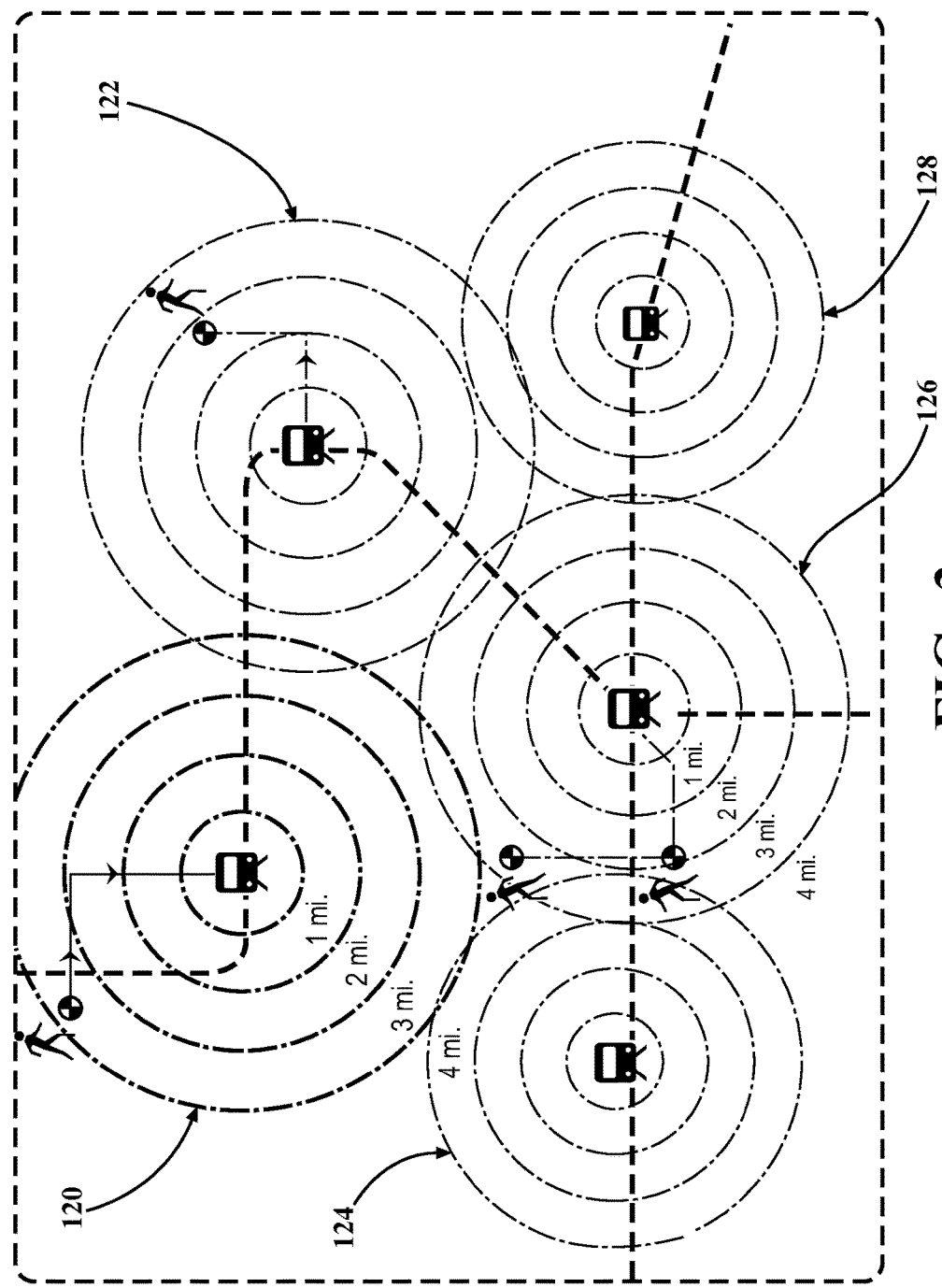
FIG. 3 is a diagram illustrating the use of the present method and apparatus over multiple service areas.

Thus, it is possible that, depending upon population density and service request density, as well as geographic features, one service zone 100 of a plurality of service zones shown in FIG. 3, can have larger or smaller overall dimensions than that of surrounding service zones.

FIG. 1 shows a travel route 108 taken by a transport 104 picking up a first customer 110 at a first location 111 and delivering the first customer 110 to the hub 102. It is possible that the transport 104 can pick up a second customer 112 at a second location 114 when transporting the first customer 110 to the node 102 as long as the predetermined transit time period can still be met.

The same predetermined transit time requirement can also apply to transporting a customer 120 from the hub 102 to a second location 122 within the service zone 100.

Figure 2:
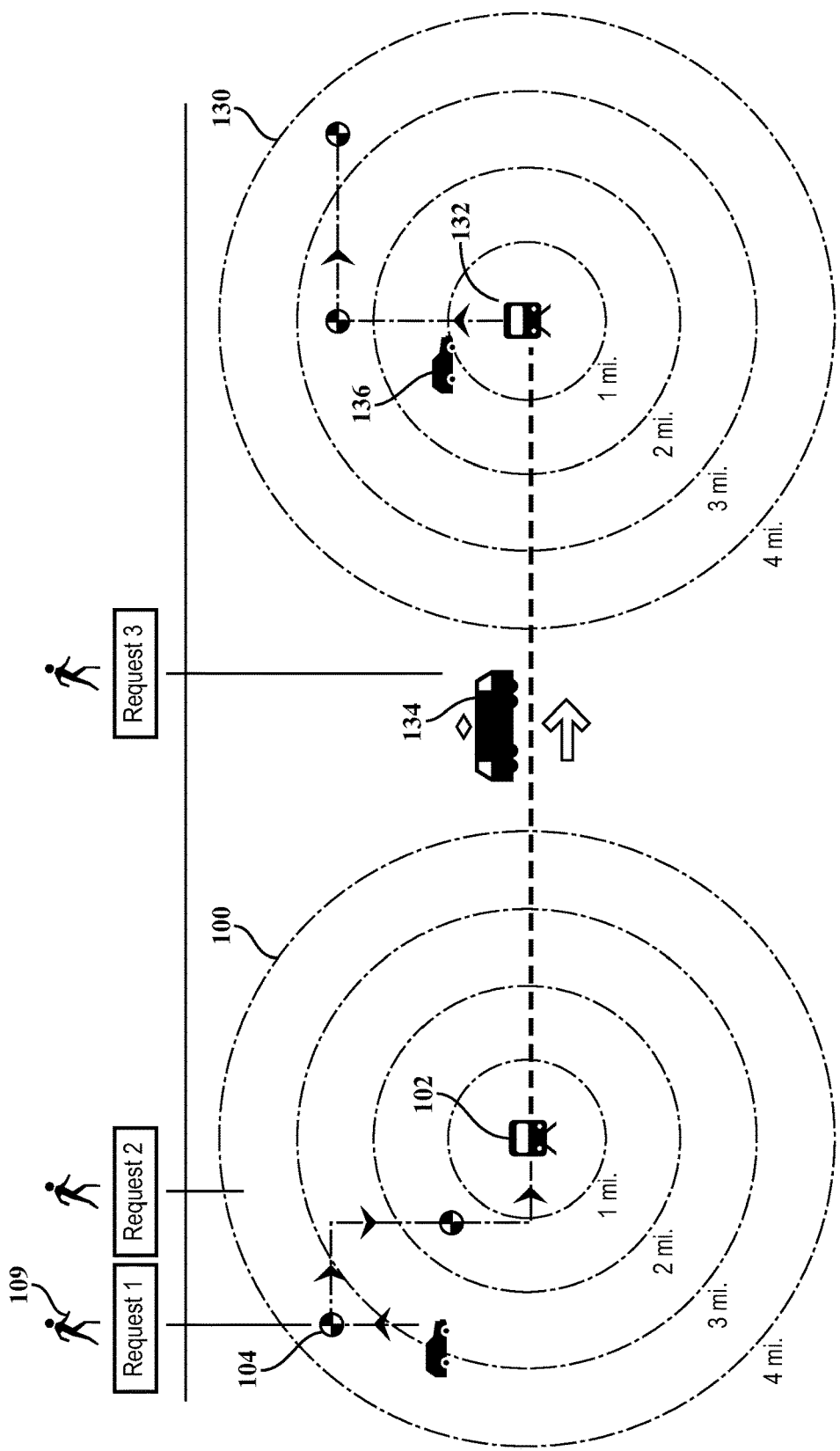
FIG. 2 is a diagram showing the delivery of a passenger from a pick-up location in one service zone to a destination location in another service zone according to the method and apparatus.

FIG. 2 depicts two service zones 100,130, one surrounding the hub 102, which will be described, for example, as utilizing transports 104 to pick-up a customer 109 and transport the customer 109 to the hub 102. From the hub 102, the customer 109 travels along the urban transit system 134 to a hub 132 in a second service zone 130. At the second in hub 132 of the second service zone 130, a separate set of transports 136 transport the customer to drop off location 138 within the second service zone 130.

FIG. 3 depicts multiple service zones, each with a small amount of overlap with adjacent service areas arranged in a city or city area along urban transit lines.

Figure 4:
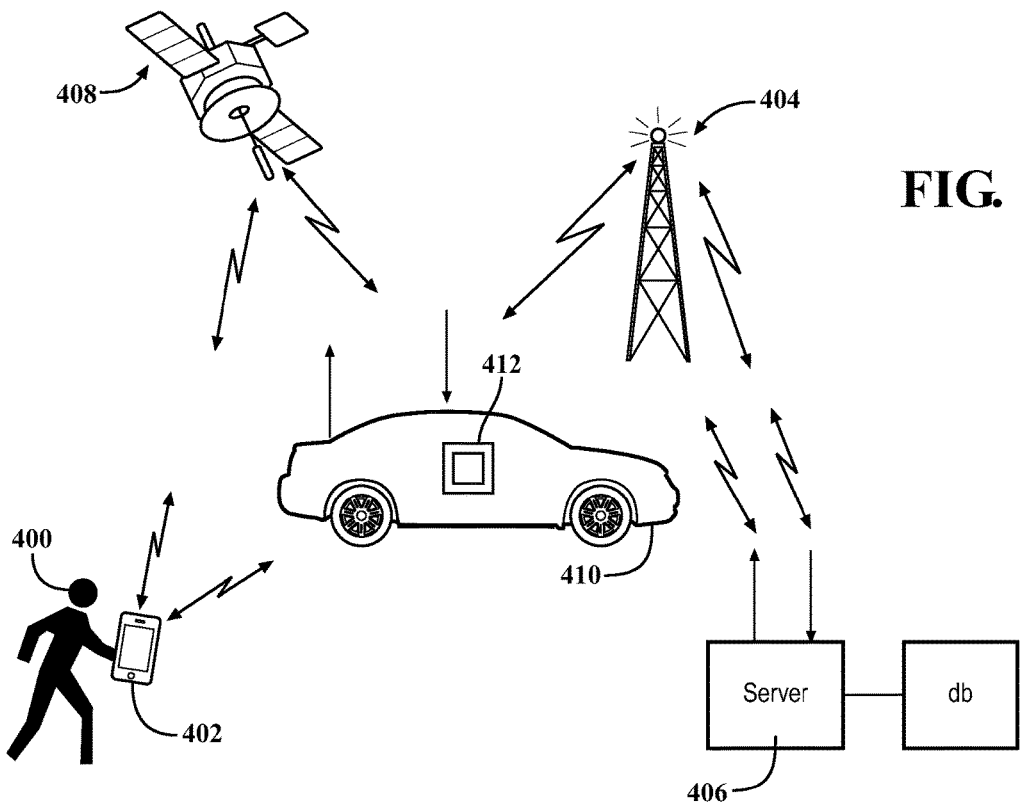
FIG. 4 is a schematic diagram illustrating the components of the apparatus for implementing the method.

For operation of the roaming transport distribution management system, each customer or potential customer 400, as shown in FIG. 4, would utilize a communication device 402. The communication device 402 may be any communication device, such as a cellular telephone, smartphone, laptop computer, tablet computer, desk-top computer etc., as long as the communication device 402 is capable of generating a pick-up request via wireless communication network 404, such as cellular network, to a system manager 406, also referred to as a server 406, as well as sending GPS location signals generated by use of a device capable of communication with GPS satellite 408 to identify the pick-up location of the customer 400.

Each transport 410 within the service zone 100 will also carry a communication device 412, such as a computer, a portable computer, a cellular telephone, tablet computer, etc., with wireless network communication and GPS communication capabilities.

The server 406, as described hereafter, may be a physical computing device with at least one processor, memory, database and wireless and GPS communication capabilities, which communicates with the customers 400 and the transports 410 via the wireless communication network 404 using GPS location data generated by the communication devices 402 and 412 carried by each customer 400 and transport 410.

In general, one customer 400 will generate a pick-up request by using an application on his communication device 402 to transmit his GPS location and the pick-up request through the wireless communication network 404 to the server 406. The pick-up request may identify the customer's name and include other customer information as well as special instructions, including time deadlines, number of passengers, luggage, etc.

In response to a pick-up request from a customer 400, the server 406, as described hereafter, will dynamically select one service transport 410 within the service zone 100 which is capable of traveling from the current location of the transport 410 to the location of the customer 400, pick up the customer, and then transport the customer along the fastest route to the hub within the predetermined maximum transit time period. This direction of customer 400 travel from a pick-up destination to the node is referred to as an inbound transport.

Figure 11:
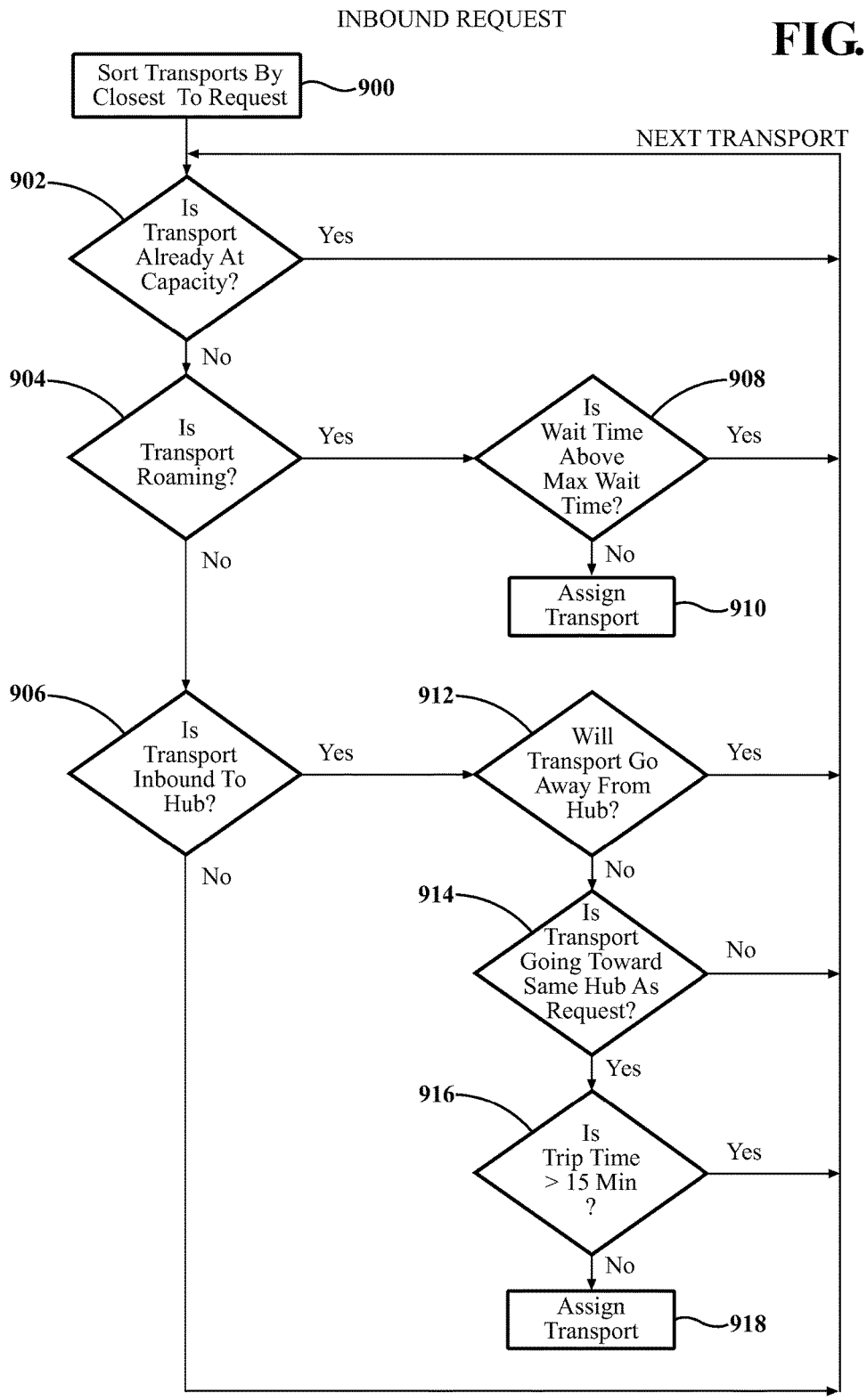
FIG. 11 is a flowchart depicting the operation of the apparatus and method for an inbound request.

For inbound requests, shown in FIG. 11, the server 406 sorts the transports in the service zone to determine which transport is closest to the customer making the request in step 900. If the closest transport to the customer making the request is already at full occupant capacity, in step 902, then the server 406 advances to check the next closest transport in the service zone to the customer making the request.

Alternately, if the selected transport in step 900 is determined in step 902 to not be at full occupant capacity, the server 406 queries if the transport is roaming in step 904. Roaming is the availability of a transport, either stationarily parked or moving within its defined coverage area, described hereafter, and available for customer transport. A transport is removed from roaming when a transport is directed to pick up a customer or is inbound or outbound with customer(s) to and from the hub in the service zone.

If the transport is not roaming, the server 406 advances to step 906 to query if the selected transport 410 is inbound to the hub. If the selected transport is not inbound to the hub as determined in step 906, the server 406 advances to the next closest transport.

Referring back to step 904, if the server 406 determines that the selected transport is roaming, the server 406 determines if the wait time between the time that the customer made the request and the time that the selected transport 410 will arrive at the location of the customer is above a maximum wait time. If yes, the server 406 advances to select another transport. However, if the determined wait time is below the maximum wait time in step 908, the server 406 assigns the selected transport to the customer request in step 910.

Referring again to step 906, if the server 406 determines that the transport is inbound to the hub, the server in step 912 queries where the selected transport will have to move in a direction away from the hub in order to pick up another customer making the current request. If the answer is yes from step 906, the server 406 advances to select another transport.

However, if the determination in step 912 is negative, the server 406 in step 914 queries if the selected transport is heading in a direction toward the same hub as the hub in the current customer request. If not, the server 406 selects another transport to honor the customer request. However, if the determination in step 914 is yes, the server determines in step 916 if the trip time for the selected transport of the first customer picked up by the transport will exceed the predetermined transit time, such as 15 minutes, for example, in step 916 if the transport picks up the second customer making the current request. If the transit time for the first customer is less than the predetermined transit time, such as 15 minutes, from step 916, the server assigns the selected transport to honor the customer request in step 918. However, if the outcome of the query in step 916 is yes, that is, the maximum transit time would be exceeded, the server 406 advances to select another transport to honor the current customer request.

Outbound transportation via transport from the hub is also possible after the customer arrives at the hub. For example, the customer communicates via the wireless network through his communication device 402 or other means of communication to the server 406 informing the server 406 of his expected arrival time at one particular hub, along with other customer identification, preferences, etc. The server 406 then communicates with the driver of a transport 410 to insure that a transport 410 is at the hub at the time the customer 400 arrives at the hub. The transport 410 then picks up the customer 400 and transports the customer 400 to his or her drop off designation within the service zone 100. This will be referred to hereafter as an outbound transport.

Figure 12B:
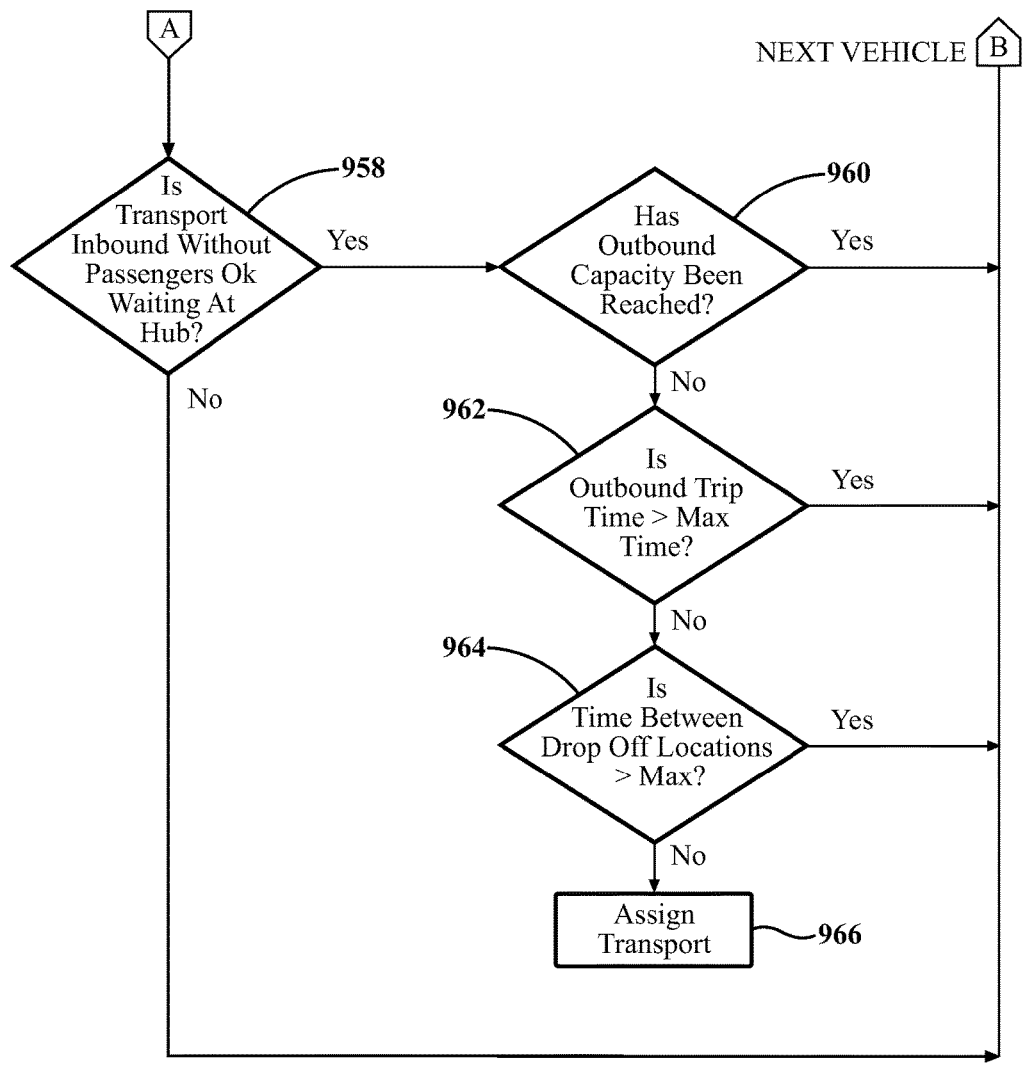

As shown in FIGS. 12A and 12B, upon receiving an outbound request from a customer, the server 406 sorts the transports in the service zone to determine which transport is closest to the hub in step 940. If the first selected transport is determined to be roaming in step 942, the server 406 assigns the selected transport to honor the customer outbound request in step 944.

However, if the selected transport is not roaming at step 942, the server 406 queries if the transport is inbound to the hub with customers in step 946. If answer is yes from step 946, the server 406 in step 948 queries if the outbound capacity of the selected transport has been reached. If the answer to the query in step 948 is yes, the server 406 advances to select another transport to honor the outbound customer request.

However, if the outcome of the query in step 948 is negative, the server 406 determines if the outbound trip time of the selected transport is above the maximum wait time for the outbound customer request in step 950. If the determination is yes, the server 406 advances to select another transport. However, if the inbound trip time is below the maximum wait time to honor the outbound customer request, the server 406 in step 952 determines if the outbound trip time to the customer's destination is greater than the maximum transit time in step 952. If the determination is yes, the server 406 advances to select a different transport. However, if the outcome of the query in step 952 is negative, the server 406 queries in step 954 if the time between drop offs at the hub and the destination of the outbound customer request is too large. If the determination is yes, the server 406 advances to select a different transport. However, if the time between drop offs is not too large or is below a preset maximum time, the server 406 will assign a selected transport to honor the outbound customer request in step 956.

Referring back to step 946 in FIG. 12A, if the server 406 determines that the transport is not inbound with customers, the server 406 next checks if the inbound transport is without customers or is waiting at the hub in step 958. If this determination is negative, the server 406 checks for another transport.

However, if the outcome in step 958 is yes, the server 406 determines if the outbound capacity of the selected transport has been reached in step 960. If yes, the server 406 searches for another transport. If not, the server 406 determines in step 962 if the outbound trip time for all passengers in the transport is greater than the maximum predetermined transit time in step 962. If the outcome is yes, the server 406 searches for another transport.

However, if the determination in step 962 is negative, the server 406 in step 964 determines if the time between drop off locations of the multiple customers going to different destinations in the same transport is greater than a maximum allowed time. If yes, the server 406 searches for a different transport. However, if not, the server 406 assigns the transport in step 966 to the new request.

The server 406 communicates via the wireless communication network 404 with the communication device 412 in the transport 410 and provides the driver of the transport 410 with the customer location, customer information, and other pertinent data. The server 406 also transmits information pertaining to the most expeditious route from location of the transport 410 to the first location of the customer 400 and then from the first location to the hub.

Further, the server 406 dynamically repositions the transport 410 within the service zone to optimum positions, even when the transport 410 is not transporting a customer or traveling toward a customer pick-up location. This enables the transports 410 within a service zone 100 to be optimally distributed in a manner responsive to population density and service request density in order to enable the predetermined maximum transit period to be met for all customers within a service zone.

The server 406 can dynamically change the location of one or more of the transports 410 within the service zone 100 at different times of the day to meet varying service request densities, such as morning rush hour, evening rush hour, afternoon or evening sporting events, etc.

Figure 5:
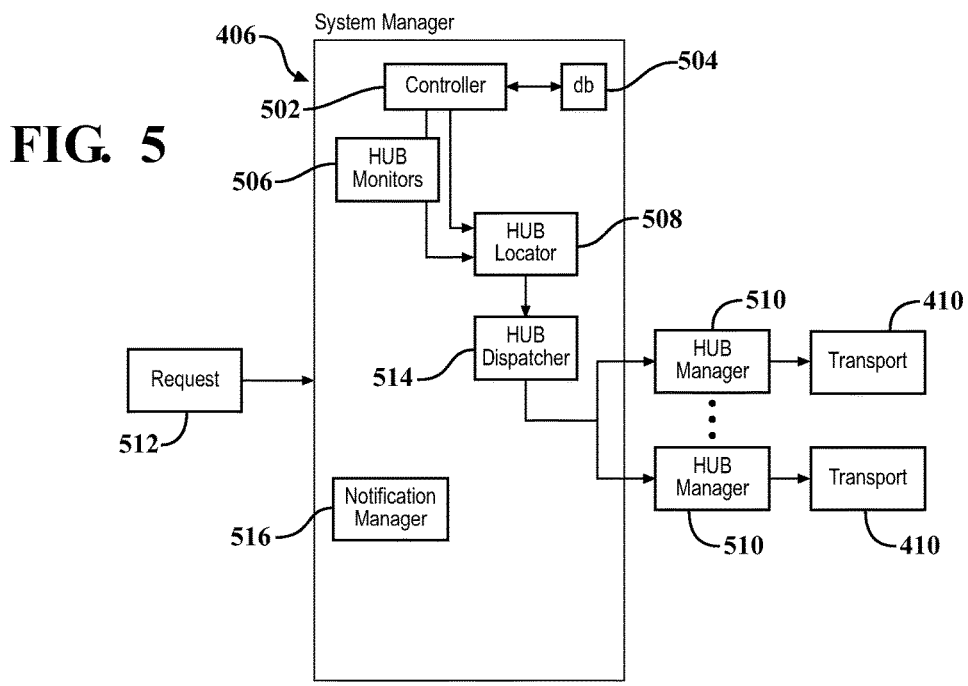
FIG. 5 is a blocked diagram showing the construction of the system manager.

The roaming transport distribution management system, as shown in FIG. 5, includes a system manager which may be incorporated into the server 406 shown in FIG. 4. The system manager 406 includes a controller, such as a processor based computing device coupled to a database 504.

It will be understood that the following description of the main functional blocks of the system manager or server 406 may be virtual elements, rather than physical computing devices.

The controller 502 is responsible for creating, deleting, and managing all of the different components of the system manager. The controller 502 creates hub monitors 506, which monitor one or more hub managers 510 within a particular area. For example, a single hub monitor 506 can monitor five managers 510. Each hub manager 510 is associated with a hub, such as hub 102, and may also be referred to as a hub 510.

The hub monitors 506 gather information necessary for the operation of the controller 502. The hub monitors 506 carry out their own thread gathering asynchronously. The hub monitors 506 primarily keep track of the location of each hub 510 and the area of coverage of the assigned hub 510.

A hub locator 508 accesses each of the hub monitors 506 to obtain information about the hubs 510. When a customer request 512 is received by the system manager 406, the controller 502 passes the request to the hub locator 508 which creates a thread and processes the hub information to determine which hub 510 should receive the request.

The hub locator 508 is coupled to a hub dispatcher 514, which is responsible for sending the request to a hub, or the hub locator 508 has located hub manager 510 after it. A notification manager 516 is provided as part of the system manager 407 to enable communication between the various components of the system manager 407. The notification manager 516 also enables threads associated with each customer request and customer transport to the hub to notify other threads when they have completed their tasks. Each thread registers itself with the notification manager 516.

Each of the components of the system manager 407 registers itself with the notification manager 516. The hubs 510 also register themselves with the controller 502, which in turn passes on the hub information to the hub monitors 506. If a hub monitor 506 is at full capacity with the predetermined number of hubs, the controller 502 will create a new hub monitor 506. When the system manager 407 receives a request 512, a hub locator 508 thread is created. The hub locator 508 looks at all of the hubs 510 controlled by hub monitors 506 to locate the closest hub 510 within a certain predetermined distance range from the customer location issuing the request 512.

The hub managers controlling each hub 510 include a roaming distribution transport algorithm for distributing transports within a service zone surrounding a hub 510 to enable each customer request 512 to be accepted and the customer delivered to the hub 510 within the predetermined maximum time period or window, such as 15 minutes for example. Even though the illustrated service zone covers concentric circles up to a four-mile radius, it will be understood that the service zone, depending upon geographic factors, population density and request density, may have a larger or smaller service area, such as from one mile up to greater than four miles.

Since maintaining all of the transports at the hub 510 would require the transports to travel a first distance out to the location of a customer making a request for transport and then retrace the same distance back to the hub, the transports would easily exceed the predetermined transit time period. As such, the transports need to be distributed throughout the service zone.

Prior transit applications provide an even distribution of the transports across the entire service zone. However, this does not take into account variations in population density, request density, geographic factor, etc.

The roaming distribution transport algorithm executed by each hub manager 510 automatically insures that the transports are distributed in a certain manner across the entire service zone so that a customer request originating from any location within the service zone can be honored within the predetermined transit time period met.

FIGS. 6-9 depict the service zone 100. Although the service zone 100 is illustrated as having a circular shape, it may have other shapes, such as rectangular, square, polygonal or an irregular peripheral boundary depending upon population density, transit request density, geographic factors, etc. The service zone 100 can have any maximum radius. The four-mile radius shown in FIGS. 1-3 may be applied to the service zone 100. Alternately, the service zone 100 can represent the one-mile sub-zone of the service zone 100 shown in FIGS. 1-3. The service zone could also apply to the entire area covered by the two-mile radius, the three-mile radius, or the four-mile radius.

As shown in FIG. 6, each transport is represented by a geometric exclusive coverage area 600, with the circular shaped coverage area shown by way of example only. Each transport is located at approximately the center of its coverage area 600 and can be stationary, or moving within a small area generally centered within the coverage area 600.

The distribution algorithm eliminates overlaps between the coverage areas 600 of all of the transports within the service zone 100.

In one configuration, all of the transports have the same size exclusive coverage areas 600 as shown in FIG. 6. The distribution algorithm, while preventing overlap between any of the edges of coverage areas 600 of the transports, is capable of moving each coverage areas 600 including coverage areas 600A-600F both radially inward and outward, or circumferentially, or in any direction (straight, arcuate, zigzag, etc.), as shown by the arrows in FIG. 6, to achieve a transport distribution which places one transport within range of any customer issuing a request within the service zone 100 to meet the predetermined maximum transit time for moving a particular transport from the present location of the transport to the location of the customer issuing the request, picking up the customer, and then transporting the customer to the hub 602.

In FIG. 7, the transport in coverage area 600A has moved to pick up a customer and can be transiting toward the hub 602. As soon as the transport is assigned a customer request and begins moving toward the location of a customer, the hub manager 510 removes the transport from roaming, as shown by the gap in FIG. 7 where coverage area 600A of the assigned transport has been removed. However, its coverage area 600A continues to impact the coverage areas of the remaining roaming transports.

Figure 8:
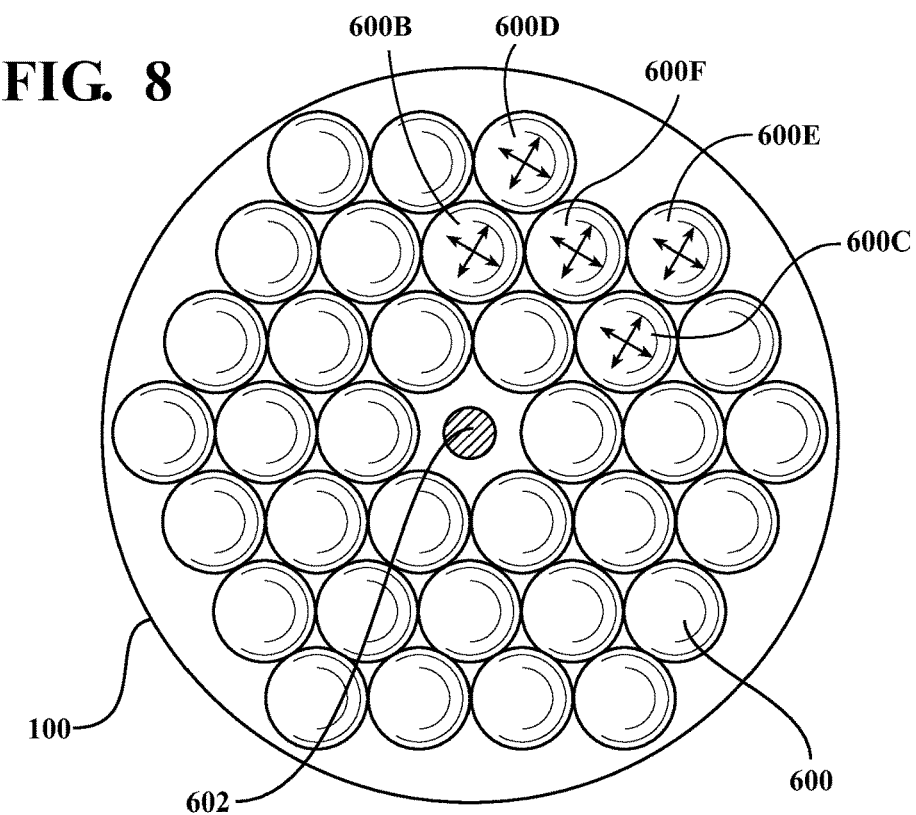

The roaming distribution transport algorithm then rebalances the location of at least one or more of the remaining transports and their associated coverage areas 600 by slightly moving one or more of the coverage area 600 in circumferential, straight, curved, or radial directions to the distribution shown by example in FIG. 8. The hub manager 510 for the service zone 100 moves, for example, coverage area 600 E radially inward to fill the gap left by the removal of the transport in coverage area 600A. The arrows in the adjacent coverage areas shows some of the directions that the hub manager 510 can move each of the coverage areas.

Any of the adjacent coverage areas 600B, 600C, 600E and 600F and their associated transports, can also be moved to a new rebalanced distribution.

Figure 9A:
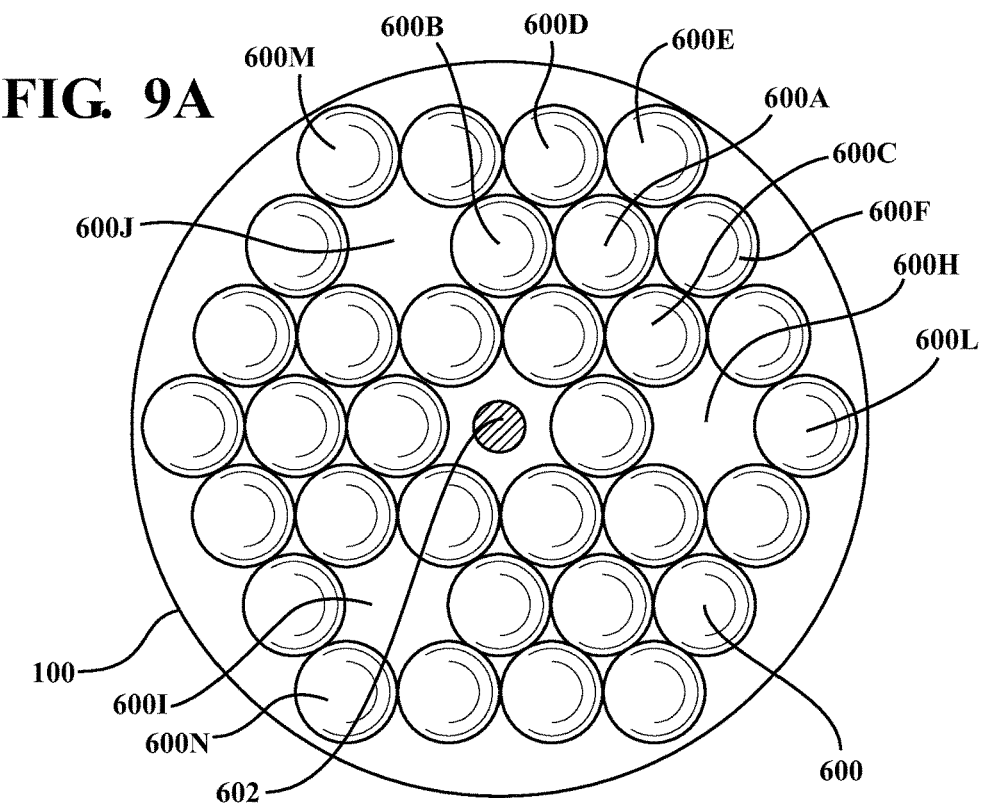

As shown by example in FIG. 9A, three gaps exist in the service zone coverage areas 600H, 600I, and 600J due to three transports being assigned to customer pick up. It should be noted that these gaps are a momentary occurrence and would normally be filled with coverage areas of adjacent located transports, such as coverage areas 600L, 600M, and 600N in the manner described above.

Figure 9B:
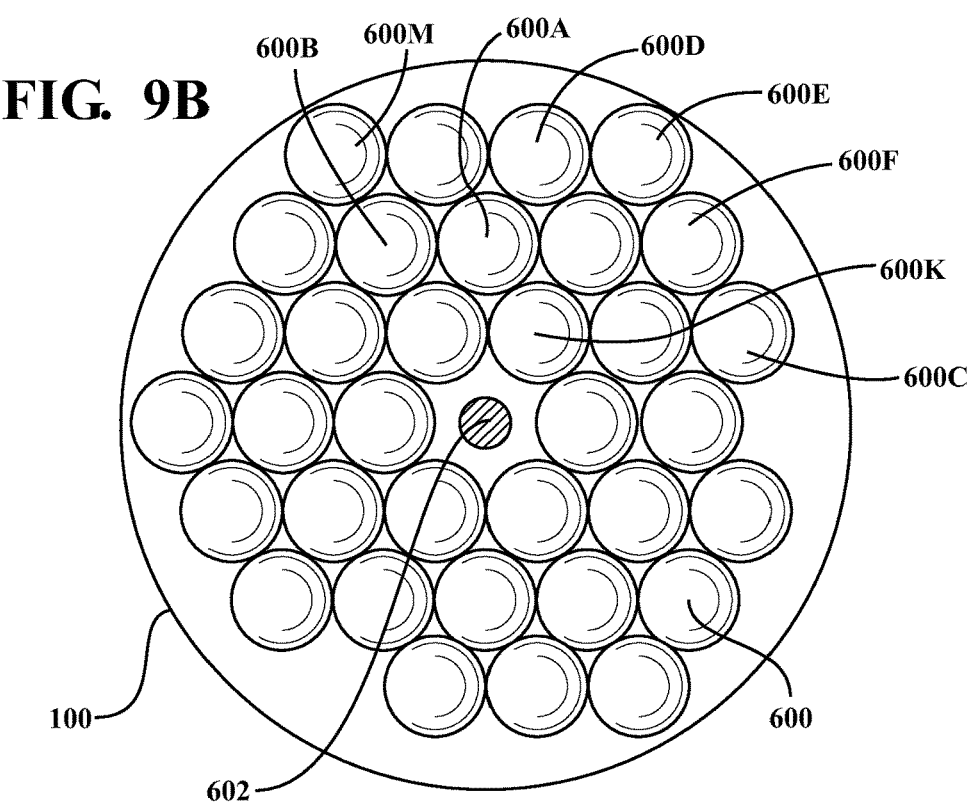
Figure 9C:
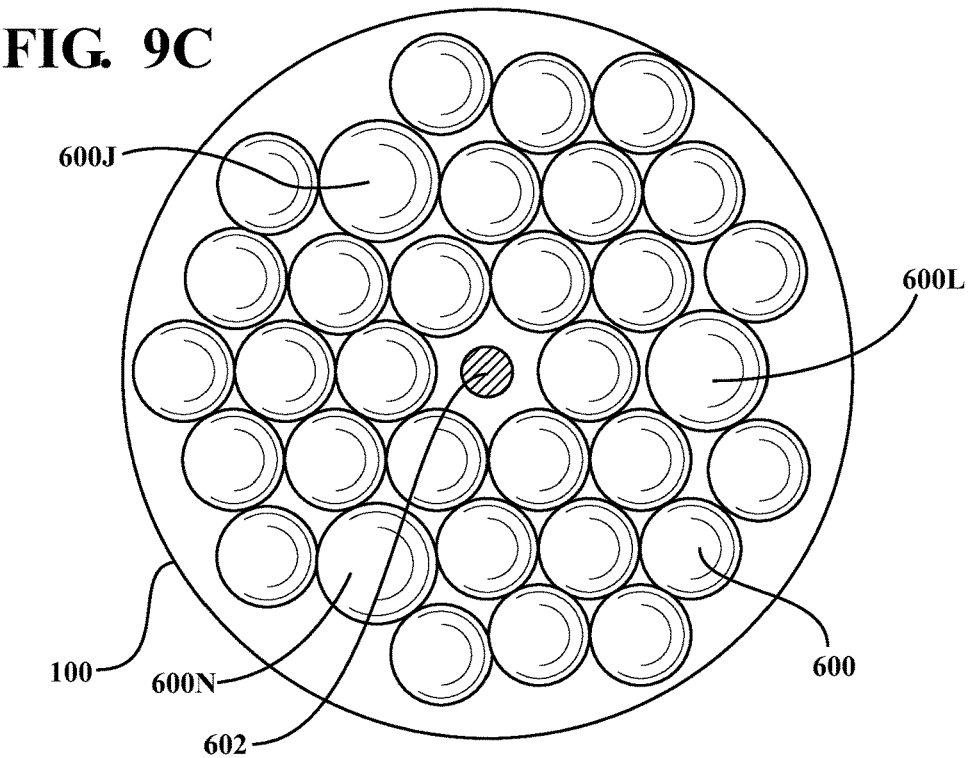

FIG. 9B depicts the operation of the hub manager 510 or server 406 in reinserting a transport back into service zone 100 after the transport has dropped off a customer at the hub 602. In this example, the hub manager 510 reinserts a transport shown by its coverage area 600K in the innermost ring of coverage areas surrounding the hub 602. The hub manager 510 rebalances the location of selected ones or all of the coverage areas 600A-600M in the service zone 100, as shown in FIG. 9B, to accommodate the reinserted transport and its coverage area 600K.

The hub manager 510 operates in a similar manner when a transport has dropped off a customer at the customer destination at any location within the service zone 100, after transit from the hub 602 or from another location within the service zone 100. The hub manager 510 can reinsert the transport, once the customer has been dropped off, at its then current location or direct a transport to a different location to fill a gap in the coverage areas within service zone 100.

This minimizes to a certain extent some of the larger gaps at the perimeter of the service zone 100, but large gap areas or open spaces at the perimeter of the service zone 100 still exist; but should be able to be covered by the closet transport to meet the maximum predetermined transit time.

Referring back to FIG. 9A, three gaps denoted by the removal of transport coverage areas 600H, 600I, and 600J are shown in service zone 100. The hub manager 510 and the server 406 can fill these gaps by also enlarging coverage areas associated with selected transports in addition to redistributing the coverage areas within the service zone 100. The enlarged coverage areas 600J, 600L, and 600N still enable customer request within the service zone 100 to be met within the predetermined pickup and/or transit time.

The distribution algorithm also is capable of taking into account population density variations within the service zone 100, historic request density variations within the service zone 100, as well as the current distribution of transports within the service zone 100. The distribution algorithm, as shown in FIG. 9D, is capable of initially providing or varying the size, in the case of the coverage areas 600 and/or the radius or diameter of each coverage area 600, based on the population or historic request density variations within the service zone 100.

Figure 9D:
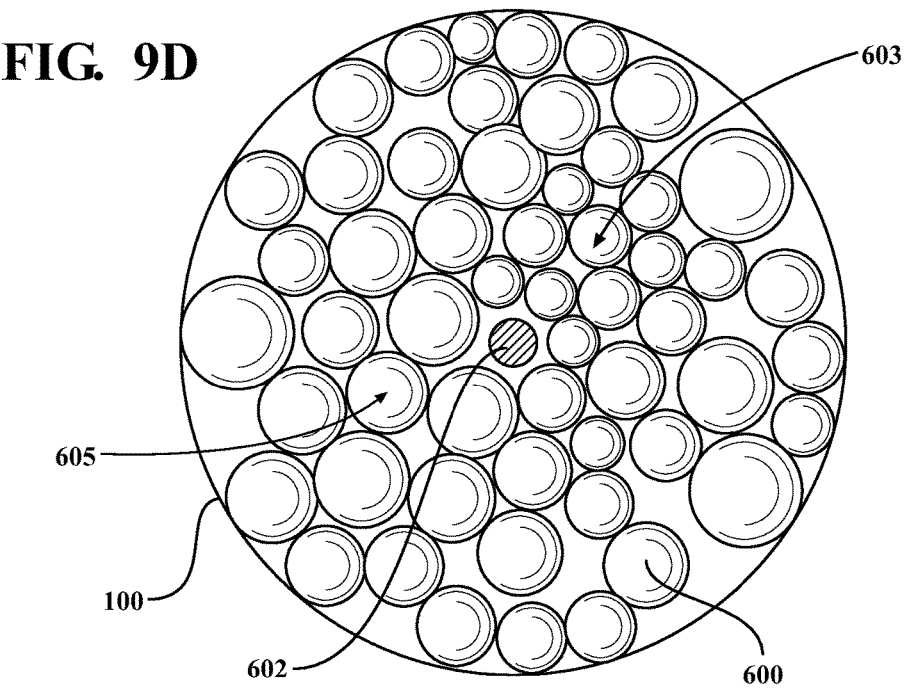

FIG. 9D shows multiple different diameter sizes of the coverage areas 600, with the size corresponding to the area of coverage for a particular transport located within each coverage area 600. Larger diameter circles, for example, indicate a larger coverage area for a particular transport. The smallest diameter circles indicate a small exclusive coverage area for a particular transport.

As shown in the upper right quadrant of the service zone 100 in FIG. 9, there is a larger density 603 of small diameter coverage areas 600. This indicates the high population density or a high historic request density within this area of the service zone 100. Conversely, in the left quadrant area 605 of the service zone 100, predominately larger sized coverage areas 600 are shown. This indicates a larger exclusive coverage area for each transport and a corresponding smaller number of transports in this area of service zone 100.

Since higher request density sub-zones of the service zone will have more customers and therefore more transports removed from the number of available transports, additional transports are provided in such areas with smaller coverage areas to accommodate all customers and still meet the predetermined transit time period.

With the variable size indicator capability within the distribution algorithm, when a particular transport is removed from roaming distribution since it is transporting a customer to the hub 602, can redistribute and rebalance the remaining available transports by either resizing the diameter of the coverage area of one or more transports or by adjusting the position of one or more of the transport coverage areas, or both changing the size of certain coverage areas and rebalancing the position of some or all of the transports and their coverage areas.

In any of the rebalancing or resizing computations performed by the distribution algorithm, the hub manager 510 will issue position commands to the effected transports via the communication network which direct the transports to change the center of their location, either the position at which they are parked or the center of the position about which they are roaming to a new position. The algorithm can incorporate a distance tolerance so that the transports are not commanded to move only short distances, but commands will be issued only when a more significant difference, such as 400 meters for example, is necessary.

The hub manager 510 receives GPS signals from the transports indicating the current position of the transports and is therefore capable of both monitoring the location of all of the transports within the respective service zone as well as issuing commands for one or more of the transports to move to different geographic locations.

Figure 10:
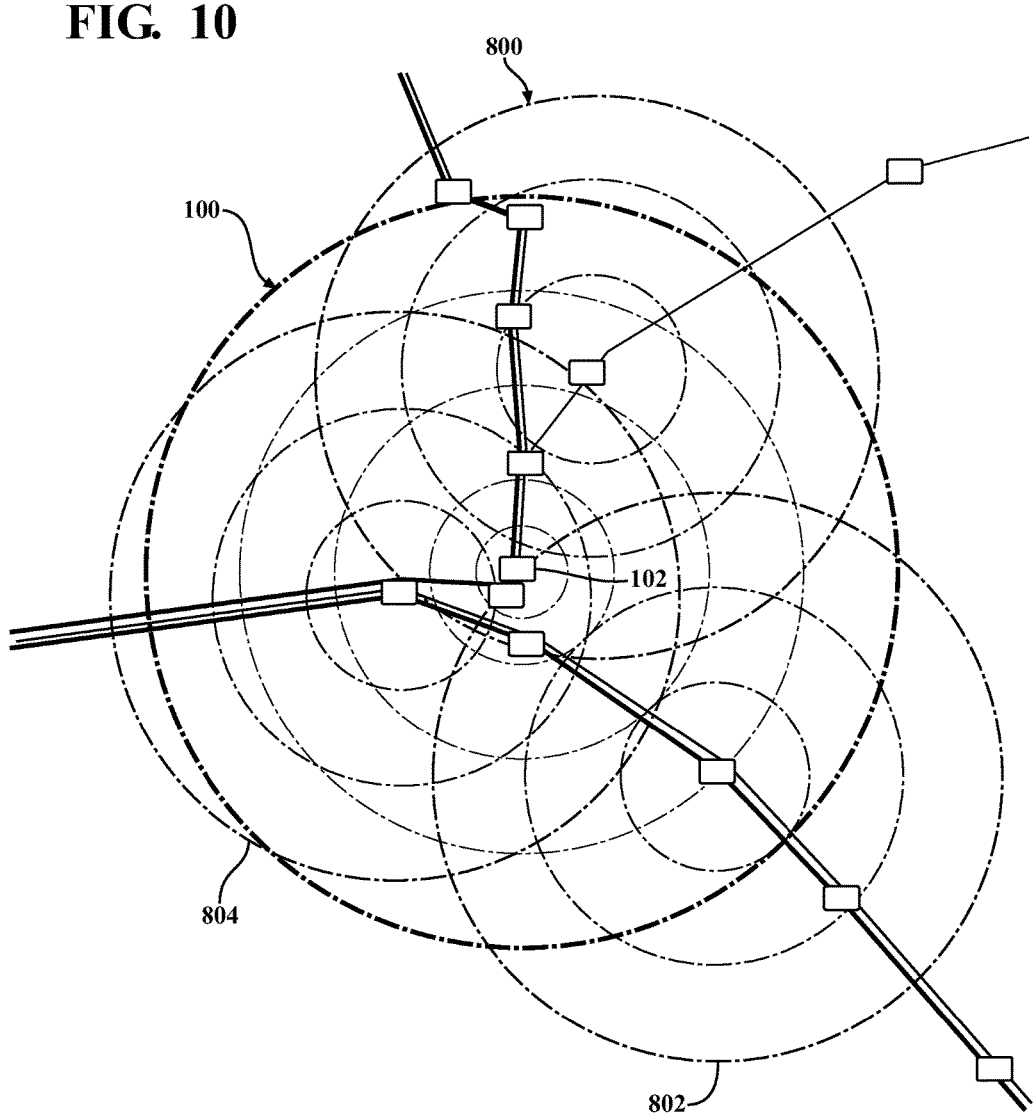
FIG. 10 is a pictorial representation of the present method and apparatus implemented in multiple overlapping service areas.

FIG. 10 depicts a modification to the coverage area 100 described above. In FIG. 10, the same service zone 100 around central node 102 still exists. However, additional coverage areas, with three coverage areas 800, 802 and 804 being shown by example, are each formed about separate nodes or hubs such as stations on mass transport lines. It will be understood that separate coverage areas, similar to coverage areas 800, 802 and 804, may be provided around each node or station in the transport area or only about certain hubs or stations. Coverage areas 800, 802 and 804 may be the same size as the coverage area 100 or maybe smaller or larger in coverage areas. Further, the coverage areas 800, 802 and 804 can be separate from or, overlap each other and, in conjunction with the coverage area 100 can form a single enlarged coverage area. Transports, as distributed and described above, in the central coverage area 100 may also serve the additional coverage areas 800, 802 and 804. The distribution of the transports may be treated as a single large transport coverage area, including coverage areas 100, 800, 802 and 804, with transport roaming within the enlarged coverage area formed by the coverage areas 100, 800, 802 and 804 and changing which hub each transport goes to depending upon what is most efficient in terms of customer requests, transport location, customer destinations, customer pick up locations, time of day, etc.

The transports may be assigned and roam in the coverage area 100, including any of the overlapped areas of the coverage area 100 and the coverage areas 800, 802, and 804, where the transports may be dedicated to a specific coverage area 800, 802 and 804 for a primary pick-up and delivery of customers from a pick-up point to an end destination, such as any of the coverage areas 800, 802 and 804, or from the hubs in the coverage areas 800, 802 and 804 to an end destination within or without of coverage areas 800, 802 and 804 to an end destination within or without the coverage areas 800, 802 and 804.

What is claimed is:

1. A method of operating a roaming transport distribution system to service customer requests for transportation comprising:
   operating a fleet of transports in a first service zone having a first hub for transporting customers within the first service zone to and from the first hub, each transport having global positioning system coordinate capability and wireless communication capability;
   receiving a service request from a first customer at a first location in the first service zone for transportation of the first customer to the first hub;
   locating a first transport of a plurality of transports in the first service zone to answer the service request based on one or more of the first location of the first customer, a second location of the first transport, a distance between the first and second locations, a travel time of the first transport from the second location to the first location, and a travel time of the first transport with the first customer from the first location to the first hub;
   sending, using a controller executing program instructions, a communication to the first transport to travel to the first location to pick up the first customer for transport to the first hub;
   coordinating, using the controller executing program instructions, coordinate positions of each of the plurality of transports in the first service zone to create an exclusive coverage area about each transport in the first service zone, the coverage areas disposed in a dynamic arrangement with adjacent transport coverage areas and the coverage areas having an uneven distribution within the first service zone to insure less than a maximum transit time for transporting a customer from a pick-up location to a drop off destination, by, in response to removal of the first transport from the plurality of transports in the first service zone when the first transport is answering a service request, issuing new coordinate information to at least one other transport in the first service zone by wireless communication to balance distribution of the remaining plurality of transports in the first service zone.

2. The method of claim 1 further comprising:
   unequally distributing all transports in the first service zone based on one of population density, historic request density, and traffic conditions.

3. The method of claim 2 further comprising:
   after the first transport picks up the first customer at the first location, removing the first transport from roaming in the first service zone; and
   relocating a position of at least one other transport in the first service zone after removing the first transport so that the coverage areas of the plurality of transports are disposed in a dynamic arrangement to insure the maximum transit time is met.

4. The method of claim 1 further comprising:
   after the first transport picks up the first customer at the first location, removing the first transport from automatic roaming in the first service zone; and
   varying a size and/or location of the coverage areas of at least one of the plurality of transports in the service zone to meet the maximum transit time at all locations within the first service zone.

5. The method of claim 1 further comprising:
choosing a second transport of the plurality of transports to answer a service request where a location of the second transport relative to a customer issuing the service request satisfies one of a minimum wait time for customer pick-up and a maximum transit time of the customer to a customer drop off destination.

6. The method of claim 1 further comprising:
reasserting a new transport into the first service zone and redistributing of the coverage areas of the plurality of transports in the first service zone to insure distribution of the coverage areas in the first service zone without overlap.

7. The method of claim 1 further comprising:
providing a plurality of additional service zones adjacent to the first service zone;
providing each additional service zone with additional transports;
controlling a location of each transport in at least two of the first service zone and the additional service zones as a single service zone.

8. The method of claim 7 further comprising:
arranging the first service zone and the additional service zones such that at least two of the first service zone and the additional service zones overlap each other.

9. A roaming transport distribution apparatus to service customer requests for transportation comprising:
providing a plurality of transports in a first service zone having a first hub for transporting customers within the first service zone to and from the first hub, each transport having global positioning system coordinate capability and wireless communication capability;
a controller executing program instructions for coordinating coordinate positions of each transport within the first service zone and selecting transports for transporting customers in response to customer requests, and in response to a location of a coverage area associated with each transport within the first service zone, for distributing the coverage areas of each transport in an uneven distribution within the first service zone to insure less than a maximum transit time for transporting a customer from a pick-up location to a drop off destination; and
the controller, in response to removal of a first transport from the plurality of transports in the first service zone when the first transport is answering a service request, issuing new coordinate information to at least one other transport in the first service zone by wireless communication to balance distribution of the remaining plurality of transports in the first service zone.

10. The apparatus of claim 9 further comprising:
the controller wirelessly communicating direction information to each transport to optimize travel of a transport from a current location of the transport to a customer or from a customer pick-up location to a customer destination.

11. The apparatus of claim 9 further comprising:
the controller executing program instructions, based on current coordinate locations of the plurality of transports remaining in roaming in the first service zone, to vary a size of the coverage area of at least one of the remaining transports to meet transport transit times associated with responses to customer requests.

12. The apparatus of claim 9 wherein coordinating the coordinate positions of each transport comprises unequally distributing all transports in the first service zone based on one of population density, historic request density, and traffic conditions.

13. The apparatus of claim 9 further comprising:
the controller removing a first transport from roaming in the first service zone after the first transport picks up a first customer at a first location.

14. The apparatus of claim 13 further comprising:
the controller relocating a position of at least one other transport in the first service zone to update the uneven distribution of the coverage areas to meet the maximum transit time after removing the first transport.

15. The apparatus of claim 13 further comprising:
the controller varying at least one of a size or a location of a coverage area to meet the maximum transit time after removing the first transport.

16. The apparatus of claim 9 further comprising:
the controller selecting a first transport of the plurality of transports to answer a service request where a location of the first transport relative to a customer issuing a service request satisfies a minimum wait time for customer pick-up.

17. The apparatus of claim 9 further comprising:
responsive to addition of a new transport to the first service zone, the controller redistributing of the coverage areas in the first service zone to insure distribution of the coverage areas in the first service zone without overlap.

18. The apparatus of claim 9 further comprising:
a plurality of additional service zones adjacent to the first service zone, each additional service zone having additional transports; and
the controller controlling a location of each transport in at least two of the first service zone and the additional service zones as a single service zone.

19. The apparatus of claim 18 further comprising:
the controller arranging the first service zone and the additional service zones such that at least two of the first service zone and the additional service zones overlap each other.

* * * * *